(12) United States Patent
Budaker et al.

(10) Patent No.: US 10,404,144 B2
(45) Date of Patent: Sep. 3, 2019

(54) POWER MACHINE TOOL HAVING AN ELECTRONICALLY COMMUTATED DRIVE MOTOR

(71) Applicant: Robert Bosch GmbH, Stuttgart (DE)

(72) Inventors: Patrick Budaker, Schorndorf (DE); Joachim Heizmann, Immendingen (DE); Albrecht Boehringer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 15/206,035

(22) Filed: Jul. 8, 2016

(65) Prior Publication Data
US 2017/0019001 A1 Jan. 19, 2017

(30) Foreign Application Priority Data

Jul. 13, 2015 (DE) .......................... 10 2015 213 043

(51) Int. Cl.
*H02K 11/25* (2016.01)
*H02K 11/21* (2016.01)
*H02K 3/52* (2006.01)
*H02K 5/22* (2006.01)

(52) U.S. Cl.
CPC ............ *H02K 11/25* (2016.01); *H02K 3/522* (2013.01); *H02K 5/225* (2013.01); *H02K 11/21* (2016.01); *H02K 2203/03* (2013.01)

(58) Field of Classification Search
CPC ........ H02K 11/25; H02K 11/21; H02K 11/30; H02K 11/33; H02K 11/18; H02K 3/522; H02K 5/225; H02K 2203/03; H02K 2211/03

USPC ............................... 310/50, 68 R, 68 B, 68 C
See application file for complete search history.

(56) References Cited

U.S. PATENT DOCUMENTS

| | | | | |
|---|---|---|---|---|
| 5,879,785 | A * | 3/1999 | Shin .......................... | B25J 9/00 428/209 |
| 6,020,660 | A * | 2/2000 | Wright .................... | H02K 29/08 310/214 |
| 6,081,056 | A * | 6/2000 | Takagi ..................... | H02K 5/08 310/216.137 |
| 6,326,879 | B1 * | 12/2001 | Hangmann .......... | H01H 37/043 310/68 C |
| 2011/0232402 | A1 * | 9/2011 | Schaefer ................ | H02K 11/25 74/399 |
| 2015/0340923 | A1 * | 11/2015 | Lee .......................... | F04D 17/08 310/71 |

* cited by examiner

*Primary Examiner* — Michael Andrews
(74) *Attorney, Agent, or Firm* — Norton Rose Fulbright US LLP; Gerard Messina

(57) ABSTRACT

In a power machine tool which has an electronically commutated drive motor that has a motor shaft and to which a stator core is assigned that s provided at least sectionally with an insulating body at one axial end, with a printed circuit board being disposed in the area of the insulating body and being provided with at least one rotational-direction sensor and at least one temperature sensor as well as a contact element for the electrical contacting of the at least one rotational-direction sensor and the at least one temperature sensor, the printed circuit board is aligned at least sectionally parallel to the motor shaft, and is disposed on the insulating body in such a way that the at least one rotational-direction sensor faces the motor shaft.

8 Claims, 5 Drawing Sheets

POWER MACHINE TOOL HAVING AN ELECTRONICALLY COMMUTATED DRIVE MOTOR

CROSS REFERENCE

The present application claims the benefit under 35 U.S.C. § 119 of German Patent Application No. DE 102015213043.6 filed on Jul. 13, 2015, which is expressly incorporated herein by reference in its entirety.

BACKGROUND INFORMATION

The present invention relates to a power machine tool which features an electronically commutated drive motor that has a motor shaft and that is assigned a stator core which is provided at least sectionally with an insulating body at one axial end, a printed circuit board being disposed in the area of the insulating body, the printed circuit board being provided with at least one rotational-direction sensor and at least one temperature sensor as well as a contact element for the electrical contacting of the at least one rotational-direction sensor and the at least one temperature sensor.

Conventional power machine tools may have an electronically commutated drive motor that has a motor shaft. In that case, the motor shaft is surrounded by a stator core which is provided with an insulating body, the insulating body being in two parts and a corresponding insulating-body element being disposed at each axial end of the stator core. Moreover, at one axial end of the stator core, a printed circuit board is disposed that is aligned in a direction perpendicular to the axis of rotation of the motor shaft. The printed circuit board has at least one rotational-direction sensor for generating a rotational-direction signal and at least one temperature sensor for ascertaining a temperature of a motor winding assigned to the drive motor, as well as a connecting element for transmitting signals ascertained in each case to a motor control of the drive motor. The mounting of the printed circuit board on the stator core requires precise alignment in order to permit ascertainment of a comparatively exact rotational-direction signal.

SUMMARY

The present invention provides a new power machine tool which features an electronically commutated drive motor that has a motor shaft and to which a stator core is assigned which is provided at least sectionally with an insulating body at one axial end, a printed circuit board being disposed in the area of the insulating body, the printed circuit board being provided with at least one rotational-direction sensor and at least one temperature sensor as well as a contact element for the electrical contacting of the at least one rotational-direction sensor and the at least one temperature sensor. The printed circuit board is aligned parallel to the motor shaft at least in some areas, and is disposed on the insulating body in such a way that the at least one rotational-direction sensor faces the motor shaft.

The present invention thus makes it possible to provide a power machine tool in which a comparatively exact rotational-direction signal is able to be ascertained and made available to the motor control, thus permitting an increase in the lifetime of the drive motor, and therefore of the power machine tool.

Preferably, the at least one rotational-direction sensor is situated in a first section of the printed circuit board, the first section being formed at least in portions in the shape of an annular segment and being disposed coaxially to the motor shaft. The comparatively exact rotational-direction signal may thus be ascertained easily and reliably.

According to one specific embodiment, the first section of the printed circuit board is secured at least in portions in an assigned recess in the insulating body. Reliable and sturdy mounting of the printed circuit board on the insulating body may thus be facilitated.

Preferably, the contact element is placed on a second section of the printed circuit board, the second section being aligned at least approximately in the radial direction of the stator core. The contact element may therefore be disposed in an easy manner on the printed circuit board.

The printed circuit board is preferably a flexible printed circuit board that is joined at least sectionally to a stabilizing element for stabilizing and/or positioning on the insulating body. The printed circuit board may thus be mounted stably and sturdily on the insulating body and easily aligned on it by the stabilizing element.

The stabilizing element preferably has at least one positioning part for fixing the printed circuit board in position on the insulating body. Positioning of the stabilizing element and therefore of the printed circuit board may thus be facilitated in an easy manner.

The stabilizing element preferably takes the form of a sheet-metal part. A lightweight and cost-effective stabilizing element may therefore be provided.

The printed circuit board and the stabilizing element are preferably bonded to each other. The printed circuit board may therefore be mounted securely and reliably on the stabilizing element.

According to one specific embodiment, the contact element is disposed in such a way on the insulating body that it is accessible from outside of a motor housing via an opening in the motor housing of the drive motor. A simple and uncomplicated contacting with the contact element may thus be facilitated.

Preferably, the at least one temperature sensor is disposed in a third section of the printed circuit board, the third section being located by the second section of the printed circuit board and being movable relative to it. The temperature sensor may therefore easily be placed in an assigned measuring section, enabling a precise and exact temperature measurement.

Preferably, the third section is disposed at least in some areas in such a way on a motor winding assigned to the drive motor, that the at least one temperature sensor for measuring a temperature of the motor winding is secured to it via a bonded connection. Consequently an exact temperature of the motor winding may be ascertained in an easy manner.

According to one specific embodiment, a magnet element, assigned to the drive motor, projects beyond the stator core and the at least one rotational-direction sensor for forming a rotational-direction signal, in the axial direction of the stator core. An exact and comparatively interference-free measurement of the rotational-direction signal may thus be made possible.

The printed circuit board is preferably formed in the manner of a flexible printed circuit board. Consequently, a printed circuit board may be provided that adapts at least sectionally to the stabilizing element.

In addition, the present invention provides a sensor unit having a printed circuit board for an electronically commutated drive motor which has a motor shaft and to which a stator core is assigned that is provided at least sectionally with an insulating body at one axial end, the printed circuit board being mountable in the area of the insulating body and being provided with at least one rotational-direction sensor, at least one temperature sensor as well as a contact element for the electrical contacting of the at least one rotational-direction sensor and the at least one temperature sensor. The printed circuit board is able to be fixed in position on the insulating body in such a way that at least in some areas, the printed circuit board is aligned parallel to the motor shaft, and the at least one rotational-direction sensor is facing the motor shaft.

BRIEF DESCRIPTION OF THE DRAWINGS

The present invention is explained in greater detail below on the basis of exemplary embodiments shown in the figures.

DETAILED DESCRIPTION OF EXAMPLE EMBODIMENTS

Figure 1:
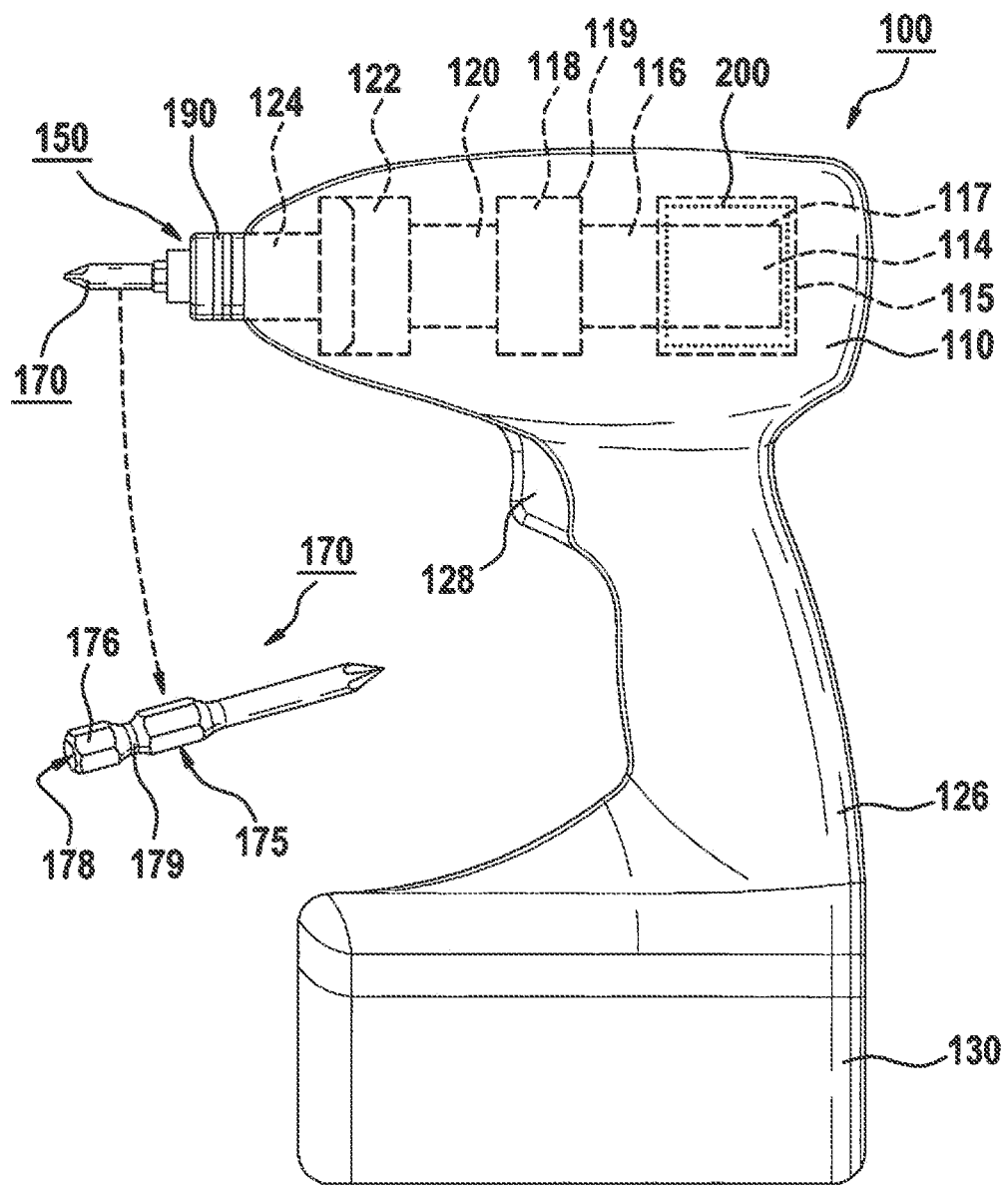
FIG. 1 shows a schematic view of a power machine tool having a drive motor and having stator components.

FIG. 1 shows a power machine tool 100 that is provided with a tool holder 150 and has a housing 110 having a hand grip 126. According to one specific embodiment, power machine tool 100 is connectable mechanically and electrically to a battery pack 130 for the cordless power supply.

By way of example, power machine tool 100 is in the form of a cordless rotary-impact screwdriver. However, it is pointed out that the present invention is not limited to cordless rotary-impact screwdrivers, but rather may be used for various power machine tools, e.g., in the case of a screwdriver, a drill/driver, a hammer drill, a saw, a grinding machine, a milling machine, etc., regardless of whether power machine tool 100 is operable cordlessly with battery pack 130 or in corded fashion.

Disposed in housing 110 are an electric drive motor 114 supplied with current by battery pack 130, a gear unit 118 and an optional striking mechanism 122. For example, drive motor 114 is operable, that is, is able to be switched on and off, via a manual switch 128, and preferably is electronically controllable or regulable in such a way that both a reverse operation as well as setpoint selections with respect to a desired rotational speed are able to be realized.

According to one specific embodiment, drive motor 114 is an electronically commutated drive motor, preferably a direct-current motor, which illustratively has stator and rotor components 200 and 117, respectively. By way of example, stator components 200 form an outer stator and are described in greater detail in FIG. 2. A further description of rotor components 117 forming an inner rotor is omitted in order to keep the specification simple and concise. However, it is pointed out that the description of a drive motor having an outer stator and inner rotor has only exemplary character and is not to be understood as a restriction of the invention, which may also be used in the case of a drive motor having an inner stator and outer rotor. Moreover, to keep the specification simple and concise, a description of the functionality of electronically commutated drive motor 114 is also omitted, since it is sufficiently familiar to one skilled in the art.

Drive motor 114 is connected via an assigned motor shaft 116 to gear unit 118, which converts a rotation of motor shaft 116 into a rotation of a driving element 120, e.g., a drive shaft, provided between gear unit 118 and striking mechanism 122. Preferably, this conversion is accomplished in such a way that driving element 120 rotates with increased torque but reduced rotational speed relative to motor shaft 116. Drive motor 114 is situated illustratively in a motor housing 115 and gear unit 118 is in a gear housing 119, gear housing 119 and motor housing 115 being disposed, by way of example, in housing 110.

For example, optional striking mechanism 122, connected to driving element 120, is a rotary or rotational striking mechanism that generates rapid rotary pulses with high intensity and transfers them to an output shaft 124, e.g., an output spindle. Striking mechanisms of this type are sufficiently familiar from the related art, so that a detailed description of striking mechanism 122 is omitted here for the purpose of keeping the specification concise.

Tool holder 150 is formed on output shaft 124 and is provided illustratively to receive insert tools having outer multi-edge couplings and, for example, has a locking sleeve 190 to lock these insert tools in an inner receiver of tool holder 150. In this case, as example, tool holder 150 is designed to receive an insert tool 170, formed in the manner of a screwdriver bit, that has a shank 176 having a coupling contour 175 formed in one axial end area 178, the coupling contour being formed by a multi-edge, especially hexagonal cross-section of shank 176 and an outer annular groove 179 provided on it, e.g., in accordance with DIN 3126-E6.3. Such a screwdriver bit which, illustratively, is of what is known as the hex type, is sufficiently familiar from the related art, so that for the purpose of keeping the specification concise, a detailed description is omitted here. However, it is pointed out that the present invention is not limited to the use of hex screwdriver bits, but rather, other insert tools, e.g., hex drill bits or what are known as SDS quick drill bits may also be used, depending on the form of tool holder 150 selected in each case.

Figure 2:
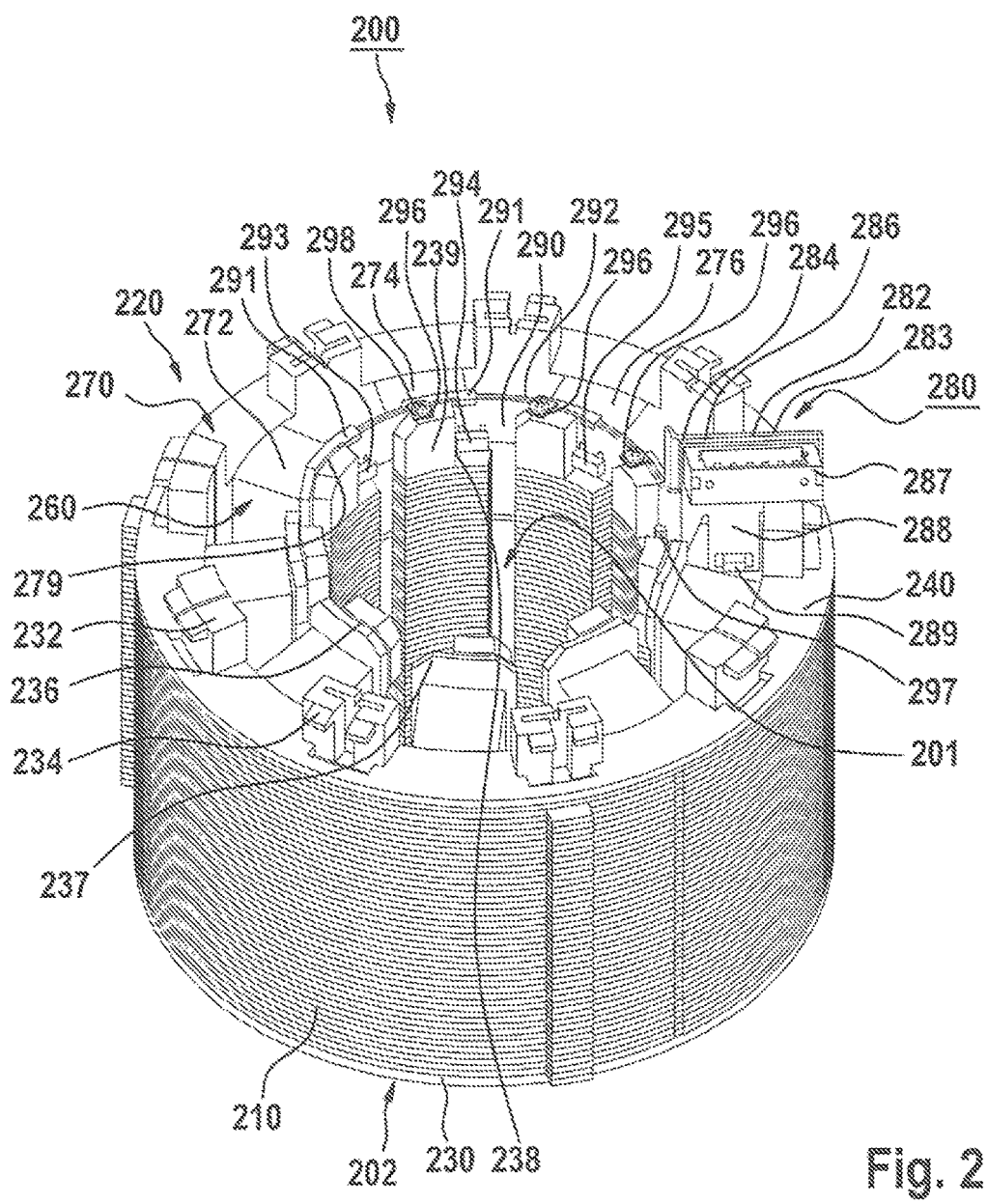
FIG. 2 shows a perspective view of the stator components from FIG. 1, having an insulating body on which a sensor unit is disposed according to the present invention.

FIG. 2 shows stator components 200 of electronically commutated drive motor 114 of power machine tool 100 from FIG. 1, which illustratively have a stator core 210 that is provided at least in some areas with an insulating body 220. For example, stator core 210 has a multitude of core laminations layered one upon the other, and together with insulating body 220, forms a plurality of stator teeth, e.g., nine stator teeth, of which only four are identified by reference numerals 270, 272, 274, 276 in order to keep the drawing simple and clear. It is pointed out that the form of stator core 210 with core laminations or as a core stack has only exemplary character and is not to be viewed as a restriction of the invention. Thus, for example, stator core 210 may also take the form of a soft-iron core.

Preferably a motor-winding section 260 for the placement of a motor winding (560 in FIG. 5) of drive motor 114 is formed on insulating body 220. In this context, for example, the motor winding (560 in FIG. 5) may be wound by any suitable winding process on stator core 210 provided with insulating body 220, and preferably may have a plurality of interconnected individual coils. By preference, according to one specific embodiment, insulating body 220 is retained on stator core 210 by the motor winding (560 in FIG. 5).

As an example, insulating body 220 has at least a first and a second insulating-body section 240, 230 which are pushed onto stator core 210 starting from axially opposite ends 201, 202 of stator core 210—in FIG. 2, from top and bottom. To simplify the description, first insulating-body section 240 is described by way of example for the two insulating-body sections 240, 230. However, it is pointed out that the two-part form of insulating body 220 having the two insulating-body sections 240, 230 has only exemplary character and is not to be understood as restriction of the invention. For instance, it may also be used in the case of one-part insulating bodies formed by plastics injection molding, for example, or multi-part, e.g., three-part or four-part insulating bodies, as well.

Illustratively, by preference at least one and, e.g., nine outer axial extensions are formed on first insulating-body section 240, of which only two are identified by reference numerals 232, 234 in order to keep the drawing simple and clear. For instance, they may be used to align and secure stator components 200 in motor housing 115 from FIG. 1 when producing drive motor 114 from FIG. 1. Moreover, at least one and, exemplarily, nine inner axial extensions are formed on insulating-body section 240, of which only two are identified by reference numerals 236, 237 for the purpose of keeping the drawing simple and clear. Inner axial extensions 236, 237 are used, inter alia, for the radial fixation of an assigned motor winding (560 in FIG. 5) on stator teeth 270, 272, 274, 276. It is pointed out that insulating-body sections 230, 240 are formed only illustratively with outer extensions 232, 234 and inner extensions 236, 237, however, may also be formed with only outer or with only inner extensions. In addition, insulating-body sections 230, 240 may also be formed without extensions. Furthermore, the extensions may also be located on only one of insulating-body sections 230, 240.

According to one specific embodiment, in the area of insulating body 220, on one insulating-body section 230, 240, illustratively on first insulating-body section 240, a sensor unit 280 having a printed circuit board 284 is disposed, which at least sectionally is aligned parallel to motor shaft 116. Printed circuit board 284 is provided with at least one, illustratively with three rotational-direction sensors 293, 294, 295, and has at least one temperature sensor 289 as well as a contact element 287 for the electrical contacting of rotational-direction sensors 293, 294, 295 and temperature sensor 289.

According to one specific embodiment, printed circuit board 284 has a first, second and/or third section 290, 286, 288. Preferably, rotational-direction sensors 293, 294, 295 are provided with at least one assigned capacitor 297 and are situated in first section 290 of printed circuit board 284. For example, rotational-direction sensors 293, 294, 295 are formed in the manner of a Hall sensor and may be used to sense rotational position for rotor components 117 from FIG. 1.

Preferably, first section 290 is at least sectionally in the shape of an annular segment and is disposed coaxially with respect to motor shaft 116. In this context, rotational-direction sensors 293, 294, 295 are situated facing motor shaft 116. Illustratively, inner axial extensions 236, 237 of insulating body 220 have a recess 238 for the placement of rotational-direction sensors 293, 294, 295; recess 238 preferably halves inner axial extensions 236, 237 at their end facing motor shaft 116. In addition, first section 290 is disposed at least sectionally in an assigned recess 279 of insulating body 220, or rather of first insulating-body section 240 and preferably is fixed at least roughly in position in it. By preference, this recess 279 is formed on at least one, illustratively on all nine inner axial extensions 236, 237. Furthermore, recess 238 is formed in such a way that recess 279 is exposed in the area of recess 238.

Moreover, second section 286 is preferably aligned at least approximately in the radial direction of stator core 210, but could also be aligned in any other direction with respect to stator core 210. Preferably, contact element 287 is situated in second section 286, second section 286 being joined to first section 290 and illustratively projecting above it in the direction of first axial end 201 of stator core 210. However, second section 286 may also be situated at a level with first section 290. In this context, contact element 287 is preferably disposed on insulating body 220 in such a way that it is accessible from outside of motor housing 115 via an opening (510 in FIG. 5) of motor housing 115 of drive motor 114.

In addition, temperature sensor 289 is preferably situated in third section 288 of printed circuit board 284, third section 288 being disposed on or by second section 286 of printed circuit board 284, and preferably being joined to it. Moreover, third section 288 is preferably formed in a manner allowing movement relative to second section 286, thereby permitting variable positioning of temperature sensor 289 on the motor winding (560 in FIG. 5). Illustratively, in FIG. 2, third section 288 is disposed on second section 286 in the direction of stator core 210, i.e., in the direction of second axial end 202 of stator core 210, but could also be disposed in the direction of first axial end 201, that is, pointing away from stator core 210, or be placed in the direction of first section 290 or in the direction of a circumference of stator core 210. In addition, third section 288 may also be located on or by first section 290. In this manner, third section 288 is disposed, at least in some areas, in such a way on the motor winding (560 in FIG. 5) that temperature sensor 289 for measuring a temperature, preferably a temperature of the motor winding (560 in FIG. 5), is secured to it. In this instance, third section 288 in FIG. 2 is situated in a first position on stator core 210 or in a winding groove between two adjacent stator teeth 270, 272, 274, 276. In this context, preferably third section 288 and/or temperature sensor 289 is/are fixed in position on the motor winding (560 in FIG. 5), by preference, via a bonded connection.

Printed circuit board 284 is preferably formed as a flexible printed circuit board which, for stabilizing and/or positioning on insulating body 220, is joined at least sectionally to a stabilizing element 282. By preference, stabilizing element 282 takes the form of a sheet-metal part, but may also be formed from any other material, e.g., plastic. According to one specific embodiment, printed circuit board 284 and stabilizing element 282 are bonded to each other.

In this context, stabilizing element 282 is designed at least for the stabilizing and/or positioning of first, second and/or third section 290, 286, 288. Stabilizing element 282 preferably has a first and second partial area 292, 283, analogous to printed circuit board 284. First partial area 292 preferably stabilizes and/or positions at least sectionally, by preference completely, first section 290 of printed circuit board 284 having rotational-direction sensors 293, 294, 295, and second partial area 283 stabilizes and or positions at least sectionally, preferably completely, second section 286 of printed circuit board 284 having contact element 287. In this connection, analogous to first section 290, first partial area 292 is at least sectionally in the shape of an annular segment, and second partial area 283 is aligned at least approximately in the radial direction of stator core 210, analogous to second section 286. It is pointed out that the form of stabilizing element 282 with two partial areas has only exemplary character, and it may stabilize and/or position only one section of printed circuit board 284 or all three sections of printed circuit board 284, as well.

To fix printed circuit board 284 in position on insulating body 220, stabilizing element 282 preferably has at least one, illustratively three positioning parts 296. Preferably, each positioning part 296 secures at least stabilizing element 282 via a fastening means 298 to inner axial extension 236, 237 of insulating-body section 240, or to a fastening segment 239 of insulating-body section 240. To that end, fastening segment 239 has an opening (606 in FIG. 6) for the placement of fastening means 298, fastening means 298 being formed illustratively as a screw, preferably a self-tapping screw, but may also take the form of any other fastening means, e.g., a clip. In addition, stabilizing element 282 may also be welded and/or bonded to insulating-body section 240. Moreover, at least one inner axial extension 236, 237 preferably has a clamping section 291 for the reliable mounting of stabilizing element 282 on insulating body 220.

Figure 3:
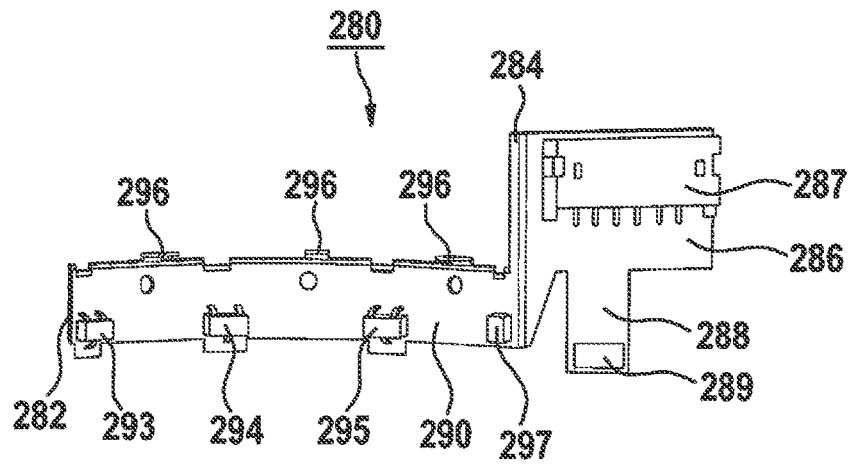
FIG. 3 shows a front view of the sensor unit according to the present invention from FIG. 2.

FIG. 3 shows sensor unit 280 from FIG. 2 and clarifies the three sections 290, 286, 288 of printed circuit board 284. FIG. 3 also elucidates the placement of printed circuit board 284 on stabilizing element 282.

Figure 4:
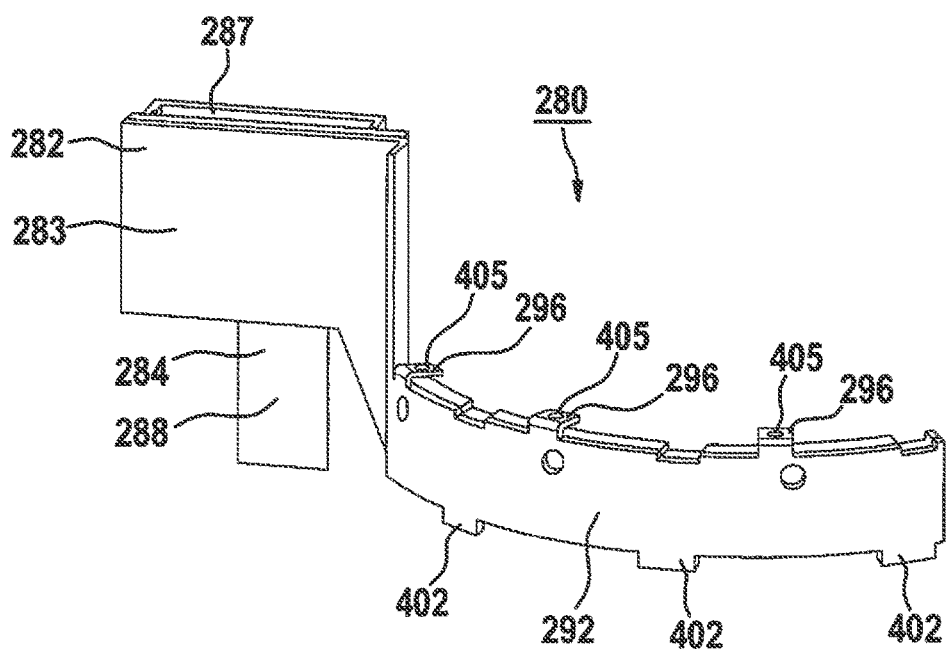
FIG. 4 shows a rear view of the sensor unit according to the present invention from FIG. 2 and FIG. 3.

FIG. 4 shows sensor unit 280 from FIG. 2 and FIG. 3 and clarifies stabilizing element 282, that is, its two partial areas 292, 283. Moreover, FIG. 4 clarifies the preferably three positioning parts 296, each of which has an opening 405 for the placement of fastening element 298 taking the form of a screw, for securing to insulating body 220. In addition, FIG. 4 shows illustratively three retaining elements 402 of stabilizing element 282, which stabilize printed circuit board 284 or first section 290 in the area of rotational-direction sensors 293, 294, 295.

Figure 5:
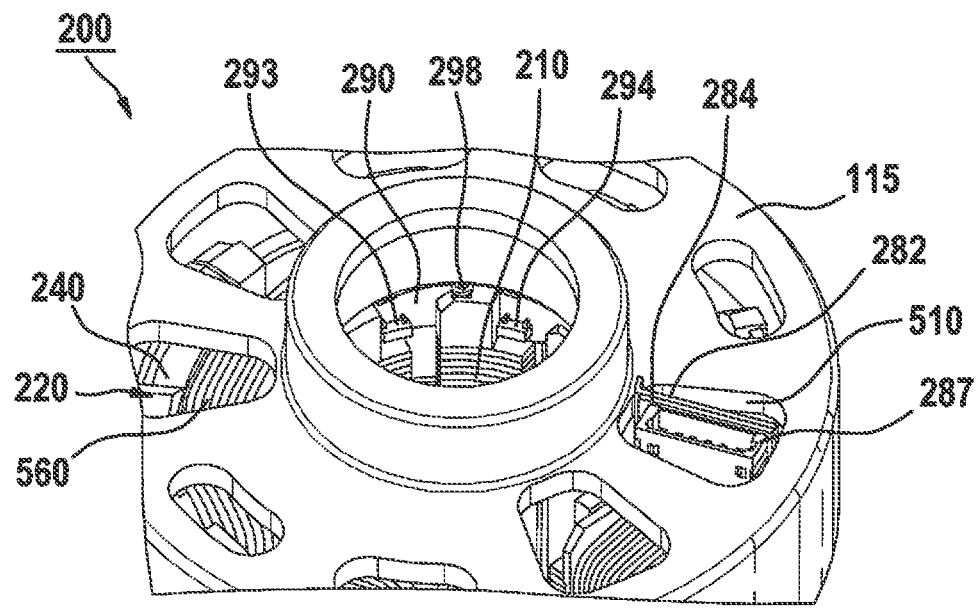
FIG. 5 shows a perspective partial view of the drive motor from FIG. 1 situated in a motor housing, having the sensor unit according to the present invention from FIG. 2 through FIG. 4.

FIG. 5 shows stator components 200 from FIG. 2 with a motor winding 560 disposed on motor-winding section 260, and with motor housing 115 from FIG. 1. Motor housing 115 preferably has at least one opening 510, in which contact element 287 of printed circuit board 284 is disposed. Contact element 287 is therefore accessible from outside of motor housing 115, which means the sensor signals of sensor unit 280 are preferably conducted to an external motor control of power machine tool 100 and may be processed.

Figure 6:
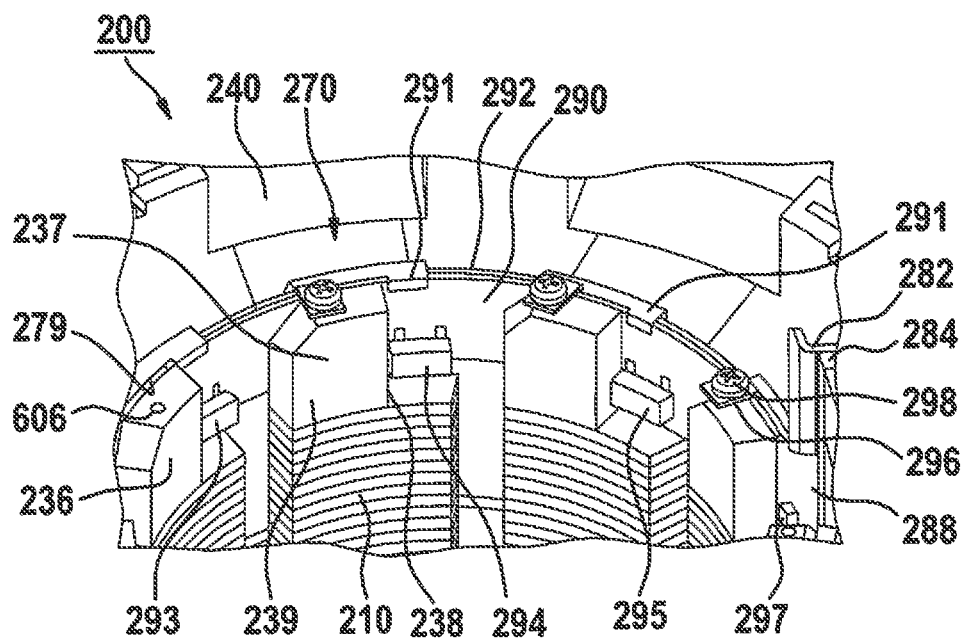
FIG. 6 shows a perspective partial view of the sensor unit from FIG. 2 through FIG. 5 disposed on the insulating body.

FIG. 6 shows stator components 200 from FIG. 2 with sensor unit 280 and elucidates the placement of rotational-direction sensors 293, 294, 295 in recesses 238 of inner axial extensions 236, 237 of insulating body 220, or rather of insulating-body section 240. FIG. 6 also clarifies the placement of first section 290 in recess 279 of inner axial extensions 236, 237 and the securing by their clamping section 291. Moreover, FIG. 6 clarifies fastening segment 239 of insulating-body section 240, or rather of extensions 236, 237, which has an opening 606 for the exemplary placement of fastening means 298. It is pointed out that the form of extensions 236, 237 having an opening 606 and having a clamping section 291 has only exemplary character and is not to be viewed as restriction of the invention. Thus, extensions 236, 237 may also have only an opening 606 or only a clamping section 291, and/or may have any other fastening means for the secure mounting of printed circuit board 282 on insulating body 220.

Figure 7:
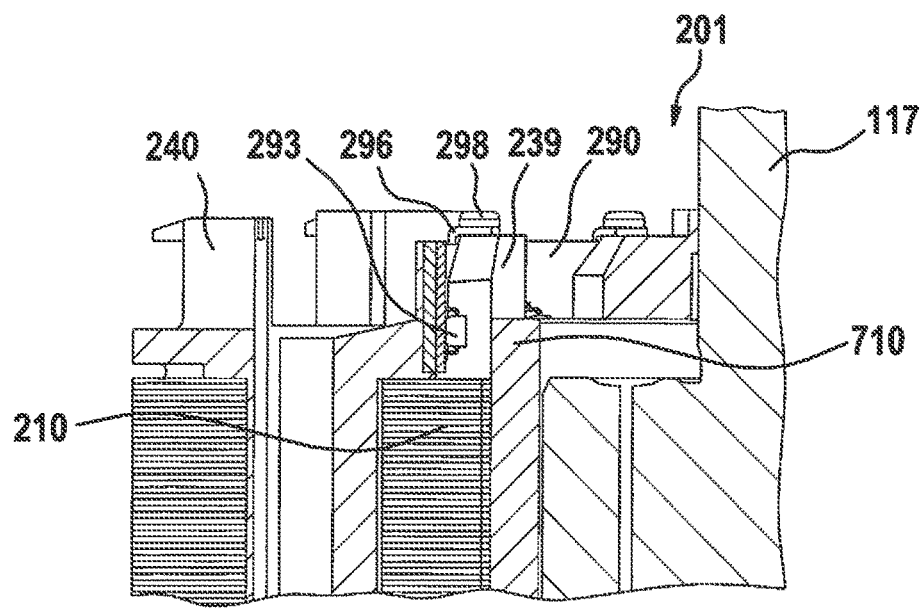
FIG. 7 shows a sectional view of the stator components from FIG. 1 and FIG. 2 with the sensor unit from FIG. 2 through FIG. 5.
Figure 8:
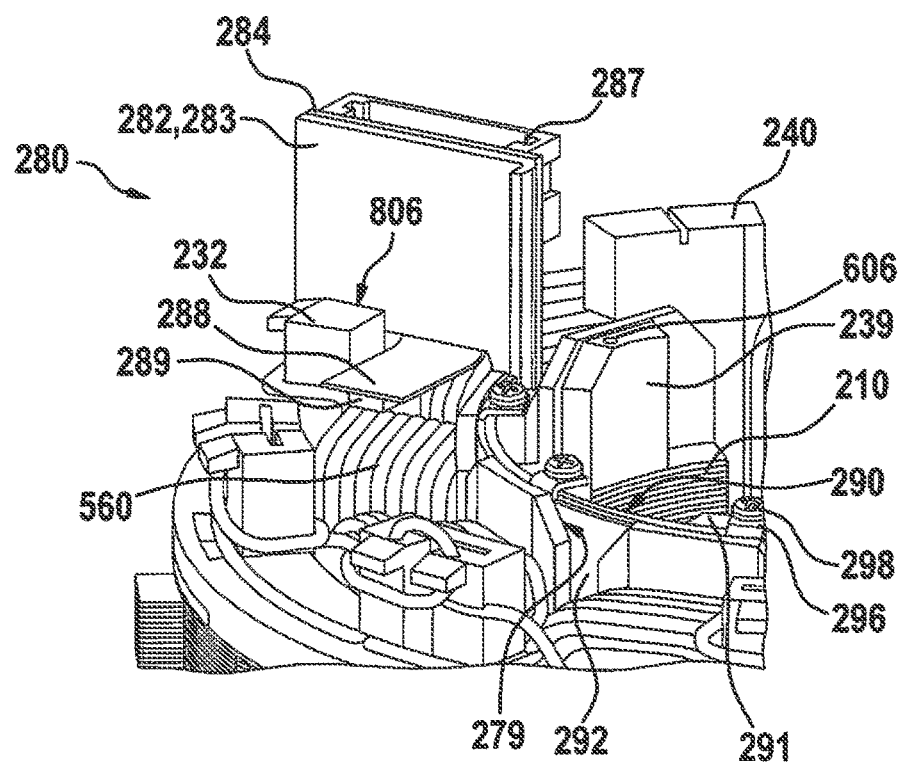
FIG. 8 shows a perspective view of the sensor unit situated on the insulating body.

FIG. 7 shows stator and rotor components 200, 117 of drive motor 114 with a magnet element 710 assigned to drive motor 114. Magnet element 710 is preferably in the form of a ring magnet. By preference, magnet element 710 projects beyond stator core 210 and rotational-direction sensors 293, 294, 295 for forming a rotational-direction signal, in the axial direction of stator core 210, that is, at its end facing first axial end 201 of insulating body 240. In this manner, the effective length of stator core 210 is not interrupted and/or shortened. In addition, the towering of magnet element 710 above stator core 210 is able to facilitate an adapted field strength. FIG. 8 shows stator components 200 from FIG. 2 with sensor unit 280, third section 288 of printed circuit board 284 being disposed in a second position. In this position, third section 288 is moved away or swung away from contact element 287, in the direction of second partial area 283 of stabilizing element 282. In this case, temperature sensor 289 is disposed in the area of motor winding 560 and is secured to it, preferably via a bonded connection. Moreover, FIG. 8 clarifies the exemplary placement of second partial area 283 of stabilizing element 282 in a recess 806 of an outer axial extension 232 of insulating body 220.

What is claimed is:

1. A power machine tool, comprising:
   an electronically commutated drive motor that has a motor shaft and to which a stator core is assigned that is provided at least sectionally with an insulating body at one axial end;
   a printed circuit board disposed in an area of the insulating body, the printed circuit board being provided with at least one rotational-direction sensor and at least one temperature sensor, and a contact element for electrical contacting of the at least one rotational-direction sensor and the at least one temperature sensor, wherein the printed circuit board is aligned parallel to the motor shaft at least in some areas, and is disposed on the insulating body in such a way that the at least one rotational-direction sensor faces the motor shaft
   wherein the contact element is disposed on a second section of the printed circuit board, the second section being aligned at least approximately in the radial direction of the stator core,
   wherein the at least one rotational-direction sensor is situated in a first section of the printed circuit board, the first section being formed at least in portions in the shape of an annular segment and being disposed coaxially to the motor shaft,
   wherein the at least one temperature sensor is disposed in a third section of the printed circuit board, the third section being situated by the second section of the printed circuit board and being movable relative to it.

2. The power machine tool as recited in claim 1, wherein the printed circuit board is a flexible printed circuit board which is joined at least sectionally to a stabilizing element for at least one of stabilizing and positioning on the insulating body.

3. The power machine tool as recited in claim 2, wherein the stabilizing element has at least one positioning part for fixing the printed circuit board in position on the insulating body.

4. The power machine tool as recited in claim 2, wherein the stabilizing element is in the form of a sheet-metal part.

5. The power machine tool as recited in claim 4, wherein the printed circuit board and the stabilizing element are bonded to each other.

6. The power machine tool as recited in claim 1, wherein the contact element is disposed on the insulating body in such a way that it is accessible from outside of a motor housing via an opening in the motor housing of the drive motor.

7. The power machine tool as recited in claim 1, wherein the third section is disposed at least in some areas in such a way on a motor winding assigned to the drive motor, that the at least one temperature sensor for measuring a temperature of the motor winding is fixed in position on it via a bonded connection.

8. The power machine tool as recited in claim 1, wherein a magnet element, assigned to the drive motor, projects beyond the stator core and the at least one rotational-direction sensor for forming a rotational-direction signal, in the axial direction of the stator core.

\* \* \* \* \*